US008676890B2

(12) United States Patent
Bigel

(10) Patent No.: US 8,676,890 B2
(45) Date of Patent: Mar. 18, 2014

(54) ONLINE DATE PLANNING SERVERS, METHODS AND COMPUTER PROGRAM PRODUCTS

(76) Inventor: Kelly N. Bigel, Washington, DC (US)

( * ) Notice: Subject to any disclaimer, the term of this patent is extended or adjusted under 35 U.S.C. 154(b) by 567 days.

(21) Appl. No.: 12/911,402

(22) Filed: Oct. 25, 2010

(65) Prior Publication Data

US 2012/0102105 A1 Apr. 26, 2012

(51) Int. Cl.
*G06F 15/16* (2006.01)
*G06F 17/30* (2006.01)

(52) U.S. Cl.
USPC ............................ 709/204; 709/207; 707/737

(58) Field of Classification Search
USPC .................................. 709/204, 207; 707/737
See application file for complete search history.

(56) References Cited

U.S. PATENT DOCUMENTS

| 2008/0120390 | A1* | 5/2008 | Robinson et al. | 709/207 |
| 2010/0088372 | A1* | 4/2010 | Shridhar et al. | 709/204 |
| 2011/0040756 | A1* | 2/2011 | Jones et al. | 707/737 |

OTHER PUBLICATIONS

*Datenightsdc*. Web. Oct. 25, 2010. <http://www.datenightsdc.org>.
"EHarmony." *Wikipedia, the Free Encyclopedia*. Web. Oct. 25, 2010. <http://en.wikipedia.org/w/index.php?title=EHarmony.com&printable=yes>.
*Find, Plan & Share Local Things to Do*—PlanJam.com. Web. Oct. 25, 2010. <http://www.planjam.com>.
"Match.com." *Wikipedia, the Free Encyclopedia*. Web. Oct. 25, 2010. <http://en.wikipedia.org/w/index.php?title=Match.com&printable=yes>.
"Need Help Planning a Romantic Date W/dancing (Glendale, Pasadena: Organic, Live In)—Los Angeles—California (CA)—City-Data Forum." *Stats about All US Cities—Real Estate, Relocation Info, House Prices, Home Value Estimator, Recent Sales, Cost of Living, Crime, Race, Income, Photos, Education, Maps, Weather, Houses, Schools, Neighborhoods, and More.* Web. Oct. 25, 2010. <http://www.city-data.com/forum/los-angeles/29629-need-help-planning-romantic-date-w.html>.
"OpenTable." *Wikipedia, the Free Encyclopedia*. Web. Oct. 25, 2010. <http://en.wikipedia.org/w/index.php?title=OpenTable&printable=yes>.

* cited by examiner

*Primary Examiner* — Olabode Akintola
(74) *Attorney, Agent, or Firm* — Mitchell S. Bigel

(57) ABSTRACT

A date planning server facilitates planning of a date between an initiator of the date and a subject of the date. Personal characteristics of the subject are obtained and stored. Various dating activities are obtained and stored. Personal characteristics are evaluated relative to the dating activities, to produce at least one proposed dating activity, which is suggested to the initiator. Related methods and computer program products are also provided.

16 Claims, 3 Drawing Sheets

ONLINE DATE PLANNING SERVERS, METHODS AND COMPUTER PROGRAM PRODUCTS

BACKGROUND

Dating is a form of courtship that may include any social activity undertaken by, typically, two persons with the aim of each assessing each other's suitability as a partner in an intimate relationship or as a spouse. Dating generally refers to the act of meeting and engaging in some mutually agreed upon social activity. Traditional dating activities may include entertainment or a meal.

Internet dating has become popular in recent times, with many online matchmaking sites, such as eHarmony® or Match.com®, providing services to match two persons based on an assessment of their suitability as a partner in an intimate relationship or as a spouse.

SUMMARY

Date planning servers according to various embodiments described herein may be used to facilitate planning of a date between an initiator of the date ("initiator") and a subject of a date ("subject"). These date planning servers may include a personal characteristics database system that is configured to obtain and store a plurality of personal characteristics of the subject. A dating activity database system may be configured to obtain and store a plurality of dating activities. An evaluator is configured to evaluate the plurality of personal characteristics relative to the plurality of dating activities, to produce at least one proposed dating activity. A planner is configured to suggest the at least one proposed dating activity to an initiator device.

In some embodiments, the personal characteristics of the subject may be obtained by accepting selection of personal characteristics from a predefined list of personal characteristics. In other embodiments, the personal characteristics may be obtained by accepting a narrative about the subject and by deriving the personal characteristics from the narrative. In still other embodiments, the personal characteristics of the subject may be obtained from an online matchmaking system.

In some embodiments, the dating activities may be obtained from websites that are associated with the dating activities. In other embodiments, the dating activities may be obtained in response to enrollment by purveyors of dating activities.

Date planning servers according to various embodiments described herein may also take into account other information in addition to the personal characteristics of the subject. For example, in some embodiments, personal characteristics of the initiator may be obtained, and the evaluator may evaluate the personal characteristics of both the subject and the initiator to produce the at least one proposed dating activity. In other embodiments, a plurality of parameters of the proposed date, including budget, time and location may be obtained, and these parameters also may be evaluated when producing the at least one proposed dating activity. In still other embodiments, at least one indication of an overall impression that the initiator wishes to create may be obtained and may also be used to produce the at least one proposed dating activity. In yet other embodiments, an indication of a category of the proposed date may be obtained and may also be used to produce the at least one proposed dating activity.

Still other embodiments may also include an ancillary services database that is configured to obtain and store at least one indication of ancillary services that the initiator may desire for the proposed date. These ancillary services may include transportation, flowers, reminders, etc. The indications of ancillary services may be evaluated by the evaluator in connection with the evaluation of the plurality of dating activities, to suggest at least one ancillary service for the at least one proposed dating activity.

The date planning server may also be interactive, according to various embodiments described herein. For example, the planner may be configured to accept selection of one of the proposed dating activities and to implement the selected one of the proposed dating activities, for example by making reservations at a restaurant, sending out an invitation, etc. Moreover, the planner may be further configured to accept modifications to the at least one proposed dating activity, and to suggest to the initiator device at least one modified proposed dating activity in response thereto.

The above summary has focused on date planning servers. However, analogous computer program products may be provided according to various other embodiments described herein. These computer program products can comprise a computer-readable medium having computer-readable program code executable by a server. The computer-readable program code may comprise first computer-readable program code that is configured to obtain and store a plurality of personal characteristics of a subject; second computer-readable program code that is configured to obtain and store a plurality of dating activities; third computer-readable program code that is configured to evaluate the plurality of personal characteristics relative to the plurality of dating activities, to produce at least one proposed dating activity; and fourth computer-readable program code that is configured to suggest the at least one proposed dating activity to an initiator device. Various other embodiments as described herein may be provided for these computer program products.

Finally, still other embodiments may provide computer-implemented methods for facilitating planning of a date between an initiator and a subject. These methods may comprise obtaining and storing a plurality of personal characteristics of the subject at a server; obtaining and storing a plurality of dating activities at the server; evaluating, at the server, the plurality of personal characteristics relative to the plurality of dating activities, to produce at least one proposed dating activity; and transmitting the at least one proposed dating activity from the server to an initiator device. Various other embodiments as described herein may be provided for these computer implemented methods.

DETAILED DESCRIPTION

Various embodiments described herein can provide online date planning to facilitate planning of a date between an initiator and a subject. Various embodiments described herein may arise from a recognition that various online resources are available to provide matchmaking services and obtain suitable subjects to date. Yet, the problem remains as to how to plan a date that will be suitable for the subject. Various online resources exist that can allow users to select restaurants, movies, hotels, destinations, etc. However, these resources presume that the user already knows that the user wishes to go to a restaurant, a movie, a destination, etc. In dating, however, this prior knowledge may not be available. Rather, the initiator may desire to arrange a successful date, but may have no idea how and/or may not have enough time, to arrange a successful date.

Figure 1:
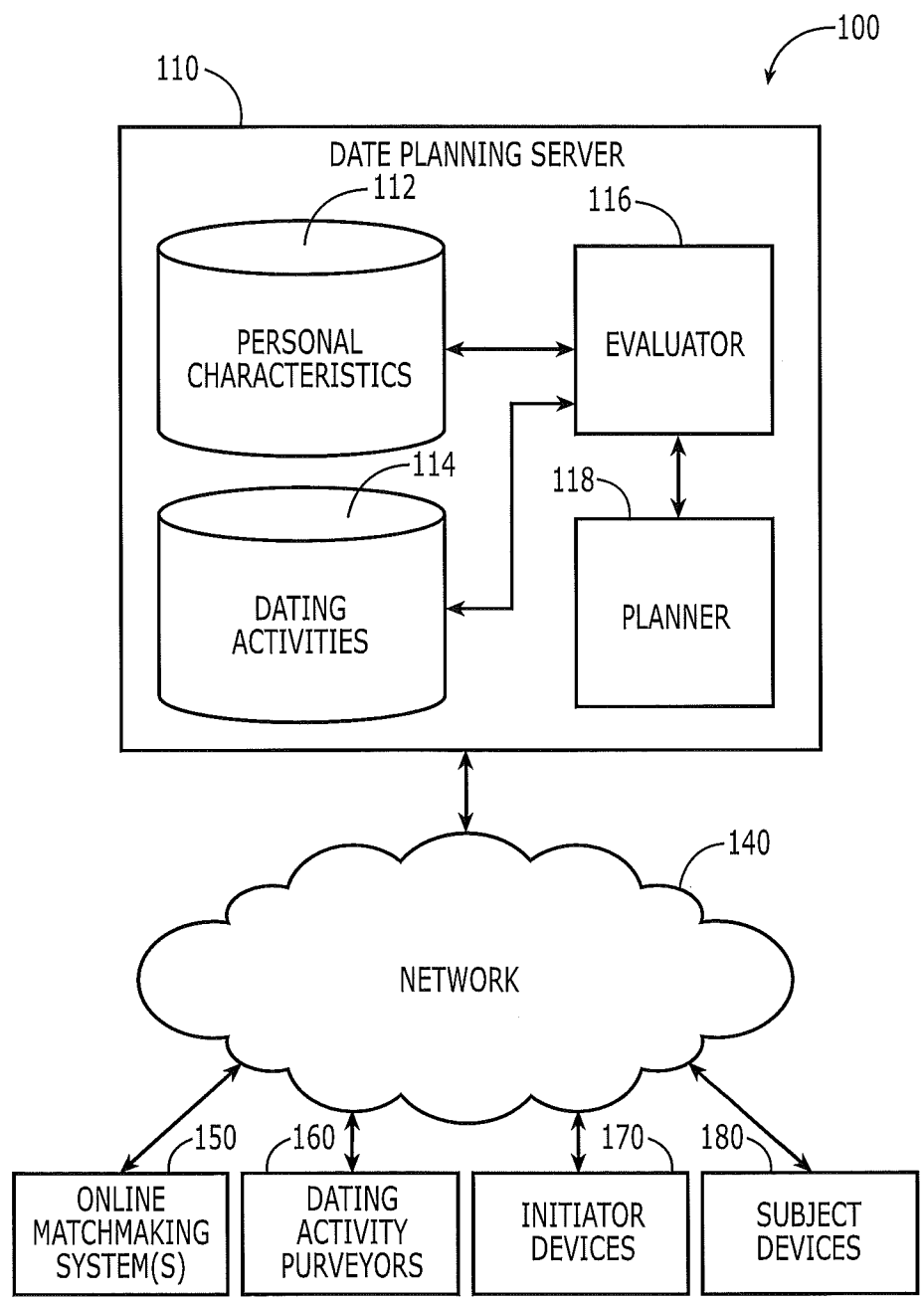
FIG. 1 is a block diagram of date planning systems, devices, methods and computer program products according to various embodiments described herein.

FIG. 1 is a block diagram of systems (including devices, such as servers), methods and/or computer program products for facilitating planning of a date between an initiator and a subject based at least upon personal characteristics of the subject, according to various embodiments described herein. These systems, devices, methods and/or computer program products 100 can obtain personal characteristics of the subject, can obtain a plurality of dating activities, and can evaluate the plurality of personal characteristics relative to the plurality of dating activities, to produce at least one proposed dating activity that can then be suggested to an initiator device.

Referring again to FIG. 1, a date planning server 110 may include databases that can obtain and store personal characteristics of the subject and that can obtain and store dating activities. Moreover, the date planning server 110 may include intelligence to evaluate the dating activities relative to the personal characteristics of the subject, to produce at least one proposed dating activity and to suggest the at least one proposed dating activity. The date planning server 110 may be embodied by one or more enterprise, application, personal, pervasive and/or embedded computer systems that may be standalone and/or interconnected by public and/or private, wired and/or wireless, real and/or virtual networks, including the Internet.

More specifically, as shown in FIG. 1, the date planning server 110 may include a personal characteristics database system 112 that is configured to obtain and store a plurality of personal characteristics of the subject. A dating activities database system 114 is configured to obtain and store a plurality of dating activities. It will be understood that the database systems 112 and 114 also may be combined or subdivided, and may themselves be embodied by one or more enterprise, application, personal, pervasive and/or embedded computer systems that may be standalone and/or interconnected by public and/or private, wired and/or wireless, real and/or virtual networks, including the Internet. The database systems may be embodied by commercially available database management systems and may include relational databases, tables, linked lists, etc.

The date planning server 110 also includes an evaluator 116 that is configured to evaluate the plurality of personal characteristics in database 112 relative to the plurality of dating activities in database 114 to produce at least one proposed dating activity. The evaluator may be embodied by various algorithms, rule-based systems, neural networks, associative memories, etc., that may be used to evaluate data in databases. The evaluator 116 also may be at least partially integrated with the personal characteristics database system 112 and/or the dating activities database system 114, and itself may be embodied by one or more enterprise, application, personal, pervasive and/or embedded computer systems that may be standalone and/or interconnected by public and/or private, wired and/or wireless, real and/or virtual networks, including the Internet.

Finally, a planner 118 is provided that may be configured to suggest at least one proposed dating activity to an initiator device 170. The planner 118 may provide user interfaces and user interaction, as will be described in detail below. The planner 118 may be at least partially integrated with the evaluator 116, the personal characteristics database system 112 and/or the dating activities database system 114 and itself may be embodied by one or more enterprise, application, personal, pervasive and/or embedded computer systems that may be standalone and/or interconnected by public and/or private, wired and/or wireless, real and/or virtual networks, including the Internet.

The date planning server 110 may communicate with external devices and/or systems via a network 140, such as one or more public and/or private, wired and/or wireless, real and/or virtual networks, including the Internet. The date planning server 110 may communicate with various devices and/or systems. For example, communications with online matchmaking systems 150, such as eHarmony® or Match.com® may be used to obtain the personal characteristics of the subject. Specifically, these online matchmaking systems 150 may obtain or derive a set of personal characteristics based on questionnaires and/or other information that is provided by users. These personal characteristics may be communicated to the date planning server 110 and stored in a personal characteristics database system 112 for use in evaluating the suitability of various proposed dating activities for a particular subject. In fact, in some embodiments, the date planning server 110 may be provided as an enhancement to online matchmaking system(s) 120.

Date planning server 110 may also communicate with dating activity purveyors 160. These dating activity purveyors 160 may provide goods and/or services that are suitable for dating and may include, for example, restaurants, movie theaters, city activity websites, travel services, florists, transportation services, etc. One example of a dating activity purveyor is the OpenTable® online restaurant reservation system. In some embodiments, the date planning server 110 may search the Internet to obtain information about various potential dating activity purveyors 160. In other embodiments, dating activity purveyors 160 may register with the date planning server 110 to be considered for potential dating activities thereof. In fact, in some embodiments, the date planning server 110 may be provided as an enhancement to an online activity purveyor 160.

Date planning server 110 also communicates with a plurality of initiator devices 170, i.e., devices that are associated with initiators of dates who desire to plan a date. These initiator devices may be embodied as one or more enterprise, application, personal, pervasive and/or embedded computers, such as desktop, notebook, netbook, laptop, smart phone, electronic book reader, game console and/or any other embedded device. A given initiator may own one or more initiator devices 170 of various configurations and/or may log onto a device that is owned and/or controlled by another entity. A given initiator also may use different initiator devices 170 in various interactions with the date planning server 110 or may use the same initiator device 170.

Finally, subject devices 180 that are associated with subjects of dates may also communicate with the date planning server 110, for example to receive an invitation for a proposed date and to respond thereto. The subject devices 180 may be embodied as one or more enterprise, application, personal, pervasive and/or embedded computers, such as desktop, notebook, netbook, laptop, smart phone, electronic book reader, game console and/or any other embedded device. A given subject may own one or more subject device 180 of various configurations and/or may log onto a device that is owned and/or controlled by another entity. A given subject may use different subject devices 180 in various interactions with the date planning server 110 or may use the same subject device 180.

Additional discussion of various embodiments of FIG. 1 will now be provided. Specifically, the personal characteristics database 112 may use various techniques to obtain and store a plurality of personal characteristics of the subject. As used herein, "personal characteristics" are those intrinsic factors that are unique to a particular person, and may otherwise be referred to as "personality traits", "character traits", "human traits", etc. In some embodiments, personal characteristics of the subject may be obtained by accepting selection by the initiator via an initiator device 170 of personal characteristics from a predefined list of personal characteristics. For example, a drop-down box may be provided that allows an initiator to check one or more personal characteristics of the subject from a predefined list of personal characteristics. In other embodiments, the initiator may be allowed to generate a narrative about the subject and the personal characteristics database system 112 may then extract from the narrative various personal characteristics. For example, keywords in the narrative may be analyzed to obtain personal characteristics. The personal characteristics may be general personality traits and/or may be selected for their, particular relevance for date planning. Moreover, various personal characteristics may be identified by "Yes/No" selections and/or by selecting from a range of values. Personal characteristics that may be particularly useful for date planning may include "sporty", "outdoorsy/organic", "social", "artsy", "eclectic", "classy", "worldly or knowledge seeker", "extroverted", etc.

In still other embodiments, an interactive question and answer session may be provided between the personal characteristics database system 112 and the initiator, so as to extract from the initiator the initiator's knowledge of the personal characteristics of the subject. Finally, yet other embodiments may obtain the personal characteristics from online matchmaking system(s) 150. These online matchmaking systems may include proprietary systems of matching users based on personal characteristics that are obtained. These personal characteristics, or personal characteristics derived therefrom, may be provided to the personal characteristics database 112. Various combinations and subcombinations of these techniques and/or other techniques may also be used. It will also be understood that the personal characteristics database 112 may need to convert the personal characteristics that are obtained into a common format, so that these common format personal characteristics may be compared with dating activities in the dating activities database system 114.

The dating activity purveyors 160 may be solicited by the date planning server 110, by employees of a date planning service and/or may be obtained by dating activity purveyors registering with the date planning server 110. More specifically, the dating activities database system 114 may search the Internet for various dating activity purveyors in advance and/or in response to a specific date planning request by a specific initiator. Alternatively, dating activity purveyors 160 may be solicited by marketing efforts by employees of the date planning service. Dating activity purveyors also may be allowed to register with the date planning server 110 to offer their services. Dating activity purveyors 160 also may be solicited via conventional advertising and/or by Internet-based advertising, for example advertising on online matchmaking system(s) 150. The dating activity purveyors 160 may be screened using various techniques to ensure that high quality activities are provided.

Various embodiments have been described above in terms of the date planning server 110 obtaining and storing a plurality of personal characteristics of the subject. However, according to various other embodiments, in order to potentially improve the likelihood of a successful date, the personal characteristics of the initiator also may be obtained and stored in the personal characteristics database system 110. In these embodiments, the evaluator 116 is configured to evaluate the plurality of personal characteristics of both the subject and the initiator relative to the plurality of dating activities in the dating activities database 110, to produce at least one proposed dating activity.

Various embodiments described in connection with FIG. 1 used personal characteristics of the subject and, in some embodiments, of the initiator, and a plurality of stored dating activities in order to produce at least one proposed dating activity. However, various embodiments that will now be described in connection with FIG. 2 may also take into account various other factors in producing at least one proposed dating activity. Thus, referring to FIG. 2, in addition to the personal characteristics database system 112 and the dating activities database system 114, a parameters database system 122, an impressions database system 124, a category database system 126 and/or an ancillary services database system 128 may also be provided. When provided, these various database systems 122-128 may also be used by the evaluator 116 to produce at least one proposed dating activity. It will be understood that, like databases 112 and 114, each of these additional databases 122-128 may be embodied by one or more enterprise, application, personal, pervasive and/or embedded computers that may be standalone and/or interconnected by a public and private, real and/or virtual, wired and/or wireless networks including the Internet, and may themselves be integrated at least in part with one another and/or with the other components of the date planning server 110.

Figure 2:
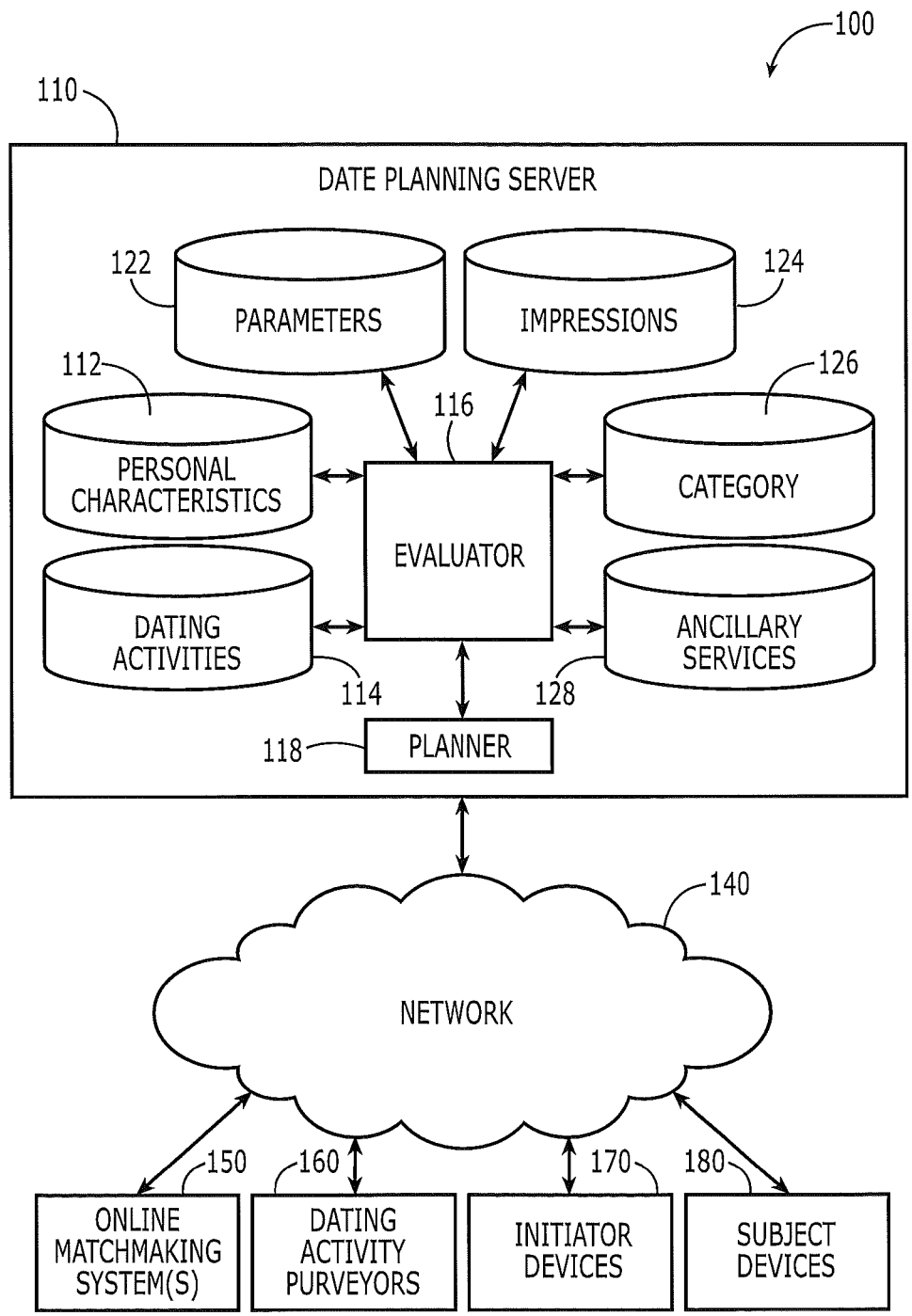
FIG. 2 is a block diagram of other date planning systems, devices, methods and computer program products according to various embodiments described herein.

More specifically, various embodiments illustrated in FIG. 2 may also include a date parameter database system 122 that is configured to obtain from the initiator and to store a plurality of parameters of the proposed date. These parameters may include a time (an exact time or a time frame), a location (an exact location, such as a neighborhood or metropolitan area and/or within a given number of miles of a location) and a budget (an exact budget or a range, that may include "free" or "money is no object"). These parameters may then be taken into account by the evaluator 116.

An impressions database system 124 may also be provided in some embodiments. The impressions database system 124 may obtain from the initiator an overall impression that the initiator wishes to create on the proposed date. The overall impression may be obtained by user input to a drop-down box and/or by a user narrative, as was described above. The overall impression may include "classy", "casual", "organic", "sporty", "spontaneous", "adventurous", "romantic", "fun", "sentimental", "impressive", etc. Multiple impressions may be selected. These overall impressions may also be used by the evaluator 116 in proposing the proposed dating activities.

A category database system 126 may also be provided in some embodiments. The category database system 126 may be configured to obtain from the initiator and to store at least one indication of a category of the proposed date. These categories may refer to broad types of activities that may be desired by an initiator, such as "wine", "dine", "dance", "move", "learn", "make". These categories may be provided by drop-down boxes and/or by a narrative. Multiple categories also may be selected. These categories may also be used by the evaluator 116 in proposing the proposed dating activities.

Finally, an ancillary services database system 128 may also be provided. The ancillary services that are obtained and stored therein may include ancillary services that the user may desire for the proposed date, for example, transportation, flowers, tickets, reminders, invitations, etc. The evaluator 116 may be configured to evaluate the personal characteristics relative to the plurality of dating activities to produce at least one proposed dating activity, and to further evaluate the at least one indication of ancillary services, to suggest at least one ancillary service for the at least one proposed dating activity. The planner 118 may then be configured to suggest the at least one proposed dating activity and the associated ancillary service(s) to the initiator.

In other embodiments, additional database systems may be provided to obtain other information that may be potentially valuable in date planning.

Figure 3:
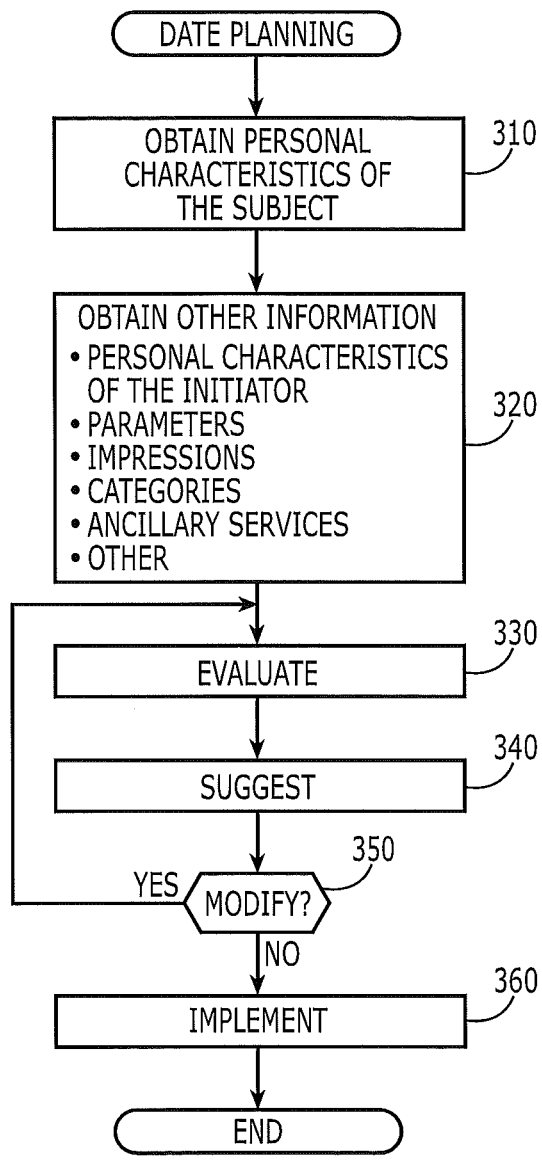
FIG. 3 is a flowchart of operations that may be performed for date planning according to various embodiments described herein.

FIG. 3 is a flowchart of operations that may be performed to plan a date according to various embodiments described herein. This flowchart may be implemented by embodiments of, for example, FIG. 2. Referring now to FIG. 3, at Block 310, personal characteristics of the subject may be obtained from the initiator device 170, from an online matchmaking system 150 and/or using other techniques. Personal characteristics may be obtained from the initiator device 170 using drop-down boxes, narrative, interactive question and answers, filling out a form and/or other techniques.

Referring now to Block 320, other information, including personal characteristics of the initiator, parameters, impressions, categories, ancillary services and/or other information may be obtained, as was described above in connection with database systems 122, 124, 126 and 128. This other information may be obtained when provided by an initiator and/or in response to specific questions that are asked to solicit some or all of this other information. The other information may be provided in one online session or over a plurality of online sessions. Moreover, operations of Blocks 310 and 320 may be combined over one or more sessions.

Still referring to FIG. 3, at Block 330, the evaluator 116 evaluates the information that was obtained at Blocks 310 and 320 to produce at least one proposed dating activity. If insufficient information is present, the evaluator may ask the initiator device 170 to provide additional information. It will be understood that the evaluator 116 may propose a plurality of proposed dating activities in an order or sequence that is based on a degree of match to the information that was obtained and/or in other sequences, such as sponsored activity sequences. At Block 340, the at least one proposed dating activity is then suggested, for example by transmitting a listing of proposed dating activities to an initiator device 170. The suggestion may be real-time or there may be time lag for obtaining a suggestion. In other embodiments, a simple, real-time suggestion may be provided, followed by a more customized suggestion.

At Block 350, the initiator may accept one or more of the proposed dating activities, in which case operations of Block 360 may be performed to implement or book the proposed dating activity by obtaining reservations at restaurants, obtaining transportation, sending flowers, and/or by confirming the date by sending an invitation to the subject, sending reminders to the initiator, etc. In other embodiments, however, the initiator may desire to modify the proposed dating activity, for example, by changing some aspect of the proposed dating activity and/or by combining various proposed dating activities that are suggested. If this is the case, then operations to evaluate at Block 330 and/or to suggest at Block 340 may again be performed. Alternatively, the modified activity may be directly implemented at Block 360.

It will also be understood that after implementing the date 360, feedback may be solicited from the initiator and/or the subject as to the success of the date. This feedback may be integrated into one or more of the database systems 112, 114, 122, 124, 126 and/or 128, so that the evaluator 116 may learn from past experiences with a given initiator/subject/provider and/or with all initiators/subjects/providers. In other embodiments, mechanisms may also be provided to cancel one or more of the dating activities and/or to cancel the date itself for various reasons.

Additional discussion of various embodiments described herein will now be provided. Various embodiments described herein can provide systemized date options to those who are challenged in creating these date options on their own. Various embodiments described herein may target people who are looking to create a successful date, but do not have the ideas or the time. Dates may be created and the components of the date may be booked and confirmed. The various inputs may be provided in a user-friendly manner, so as not to create anxiety over the date planning process.

In some embodiments, individuals seeking assistance in planning a creative and customized date can complete an application and receive multiple date options. The individual can then select their option or even mix or match certain components from each option, and then the date can be booked and confirmed.

From an economic standpoint, date planning servers, methods and/or computer program products according to various embodiments described herein may be financed by monthly, annual and/or per-date fees from the initiator and/or subject, commissions that are paid by dating activity purveyors, advertising on the site, sponsored advertising, sponsored search results and/or commissions from online matchmaking systems. Other sources of revenue may be contemplated.

Various embodiments have been described herein in connection with date planning activities. Date planning activities need not be restricted to the initial stages of meeting and getting to know another person. Rather, dating activities may also apply to a lengthy courtship, so that date planning according to various embodiments described herein may also apply to special occasions during courtship, such as an anniversary or engagement. Moreover, date planning according to various embodiments described herein may also apply to date planning with a spouse or significant other after an initial courtship. Accordingly, various embodiments described herein may cover other special occasions and life experiences.

Various embodiments have been described fully herein with reference to the accompanying figures, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and were described in detail herein. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and sub combinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A date planning server for facilitating planning of a date between an initiator and a subject, the date planning server comprising:

a personal characteristics database system that is configured to obtain and store a plurality of personal characteristics of the subject;

a dating activity database system that is configured to obtain and store a plurality of dating activities;

an evaluator that is configured to evaluate the plurality of personal characteristics relative to the plurality of dating activities, to produce at least one proposed dating activity; and a planner that is configured to suggest the at least one proposed dating activity to an initiator device, wherein the personal characteristics database system is configured to obtain the personal characteristics of the subject from an online matchmaking system that is itself configured to obtain or derive sets of personal characteristics based on questionnaires and/or other information that is provided by users for matchmaking among the users.

2. A date planning server according to claim 1 wherein the personal characteristics database system is configured to obtain the personal characteristics of the subject by accepting selection of personal characteristics from a predefined list of personal characteristics.

3. A date planning server according to claim 1 wherein the personal characteristics database system is configured to obtain the personal characteristics of the subject by accepting a narrative about the subject and by deriving the personal characteristics from the narrative.

4. A date planning server according to claim 1 wherein the dating activity database system is configured to obtain the plurality of dating activities from websites that are associated with the dating activities.

5. A date planning server according to claim 1 wherein the dating activity database system is configured to obtain the plurality of dating activities in response to enrollment by purveyors of dating activities.

6. A date planning server according to claim 1:
wherein the personal characteristics database system is further configured to obtain and store a plurality of personal characteristics of the initiator; and
wherein the evaluator is configured to evaluate the plurality of personal characteristics of both the subject and the initiator relative to the plurality of dating activities, to produce the at least one proposed dating activity.

7. A date planning server according to claim 1 further comprising:
a date parameter database that is configured to obtain and store a plurality of parameters of the proposed date including budget, time and location;
wherein the evaluator is configured to evaluate the plurality of personal characteristics and the plurality of parameters relative to the plurality of dating activities to produce the at least one proposed dating activity.

8. A date planning server according to claim 1 further comprising:
an overall impression database that is configured to obtain and store at least one indication of an overall impression that the initiator wishes to create on the proposed date;
wherein the evaluator is configured to evaluate the plurality of personal characteristics and the least one indication of an overall impression relative to the plurality of dating activities, to produce the at least one proposed dating activity.

9. A date planning server according to claim 1 further comprising:
a category database that is configured to obtain and store at least one indication of a category of the proposed date;
wherein the evaluator is configured to evaluate the plurality of personal characteristics and the least one indication of a category relative to the plurality of dating activities, to produce the at least one proposed dating activity.

10. A date planning server according to claim 1 further comprising:
an ancillary services database that is configured to obtain and store at least one indication of ancillary services that the initiator may desire for the proposed date;
wherein the evaluator is configured to evaluate the plurality of personal characteristics relative to the plurality of dating activities to produce the at least one proposed dating activity and to further evaluate the at least one indication of ancillary services and to suggest at least one ancillary service for the at least one proposed dating activity; and
wherein the planner is configured to suggest the at least one proposed dating activity and the associated at least one ancillary service to the initiator device.

11. A date planning server according to claim 1 wherein the planner is further configured to accept selection of one of the at least one proposed dating activity and to implement the selected one of the proposed dating activities.

12. A date planning server according to claim 1 wherein the planner is further configured to accept modifications of the at least one proposed dating activity and to suggest to the initiator device at least one modified proposed dating activity in response thereto.

13. A date planning server according to claim 1 wherein the date planning server is configured as an enhancement of the online matchmaking system that is itself configured to obtain or derive sets of personal characteristics based on questionnaires and/or other information that is provided by users for matchmaking among the users.

14. A date planning server according to claim 4 wherein the date planning server is configured as an enhancement of a website that is associated with the dating activities.

15. A computer program product for facilitating planning of a date between an initiator and a subject, the computer program product comprising a non-transitory computer-readable medium having computer-readable program code executable by a server, the computer-readable program code comprising:
first computer-readable program code that is configured to obtain and store a plurality of personal characteristics of the subject;
second computer-readable program code that is configured to obtain and store a plurality of dating activities;
third computer-readable program code that is configured to evaluate the plurality of personal characteristics relative to the plurality of dating activities, to produce at least one proposed dating activity; and
fourth computer-readable program code that is configured to suggest the at least one proposed dating activity to an initiator device,
wherein the first computer-readable program code is configured to obtain the personal characteristics of the subject from an online matchmaking system that is itself configured to obtain or derive sets of personal characteristics based on questionnaires and/or other information that is provided by users for matchmaking among the users.

16. A computer-implemented method for facilitating planning of a date between an initiator and a subject, the method comprising:
obtaining and storing a plurality of personal characteristics of the subject at a server;
obtaining and storing a plurality of dating activities at the server;
evaluating, at the server, the plurality of personal characteristics relative to the plurality of dating activities, to produce at least one proposed dating activity; and
transmitting the at least one proposed dating activity from the server to an initiator device,
wherein obtaining and storing a plurality of personal characteristics of the subject at a server comprises obtaining the personal characteristics of the subject from an online matchmaking system that is itself configured to obtain or derive sets of personal characteristics based on questionnaires and/or other information that is provided by users for matchmaking among the users.

* * * * *